United States Patent
Chen et al.

(10) Patent No.: US 10,810,439 B2
(45) Date of Patent: Oct. 20, 2020

(54) VIDEO IDENTIFICATION METHOD AND DEVICE

(71) Applicant: BEIJING XIAOMI MOBILE SOFTWARE CO., LTD., Beijing (CN)

(72) Inventors: Zhijun Chen, Beijing (CN); Li Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 88 days.

(21) Appl. No.: 16/107,494

(22) Filed: Aug. 21, 2018

(65) Prior Publication Data

US 2019/0130196 A1   May 2, 2019

(30) Foreign Application Priority Data

Oct. 30, 2017   (CN) .......................... 2017 1 1033501

(51) Int. Cl.
   *G06K 9/00*   (2006.01)

(52) U.S. Cl.
   CPC ..... *G06K 9/00771* (2013.01); *G06K 9/00221* (2013.01); *G06K 9/00711* (2013.01); *G06K 2009/00738* (2013.01)

(58) Field of Classification Search
   CPC ........... G06K 9/00771; G06K 9/00221; G06K 9/00711; G06K 2009/00738
   USPC ....................................................... 382/103
   See application file for complete search history.

(56) References Cited

U.S. PATENT DOCUMENTS

| | | | |
|---|---|---|---|
| 5,689,442 A | 11/1997 | Swanson | |
| 9,064,394 B1 * | 6/2015 | Trundle | .......... G08B 13/19684 |
| 2008/0301182 A1 | 12/2008 | Liu et al. | |
| 2011/0090358 A1 | 4/2011 | Tojo | |
| 2016/0078296 A1 | 3/2016 | Tojo | |
| 2017/0236010 A1 | 8/2017 | Tojo | |
| 2018/0025248 A1 * | 1/2018 | Shan | ...................... G06K 9/222 |
| | | | 382/189 |

FOREIGN PATENT DOCUMENTS

| | | |
|---|---|---|
| CN | 102598074 A | 7/2012 |
| CN | 103873825 A | 6/2014 |
| CN | 104167039 A | 11/2014 |
| CN | 104335594 A | 2/2015 |
| CN | 104754267 A | 7/2015 |
| CN | 104935888 A | 9/2015 |
| CN | 106250763 A | 12/2016 |

(Continued)

OTHER PUBLICATIONS

Supplementary European Search Report in the European application No. 18202870.4, dated Feb. 26, 2019, 9 pages.

(Continued)

*Primary Examiner* — Michael R Neff
(74) *Attorney, Agent, or Firm* — Arch & Lake LLP (57) ABSTRACT

Method and devices are provided for video identification. The method may include following actions. Event information representative of an event occurring in a space where a monitoring device is located is acquired. A time point corresponding to the event information in a video shot by the monitoring device is determined, and the event information is identified at the time point in the video shot by the monitoring device.

15 Claims, 5 Drawing Sheets

(56) References Cited

FOREIGN PATENT DOCUMENTS

CN          106803943 A     6/2017

OTHER PUBLICATIONS

First Office Action issued to Chinese Patent Application No. 201711033501.X, dated Aug. 20, 2019 and English translation, (18p).
Second Office Action of the Chinese Application No. 201711033501.X, dated May 20, 2020 with English translation, (14p).

* cited by examiner

VIDEO IDENTIFICATION METHOD AND DEVICE

CROSS-REFERENCE TO RELATED APPLICATION

This application is filed based upon and claims priority to Chinese Patent Application of International Application No. 201711033501.X, filed on Oct. 30, 2017, the entire contents of which are incorporated herein by reference.

TECHNICAL FIELD

The present disclosure generally relates to the technical field of video identification, and more particularly, to a video identification method and device.

BACKGROUND

At present, along with improvement of safety awareness of people, monitoring device may be mounted in the vicinity of inhabitants to record and monitor daily life. When a user browses a video shot by monitoring device, it is quite difficult to distinguish between important information and unimportant information, and thus the important information is easily missed.

SUMMARY

According to a first aspect of the present disclosure, a video identification method is provided. The method includes the following actions.

Event information representative of an event occurring in a space where a monitoring device is located is acquired. A time point corresponding to the event information in a video shot by the monitoring device is determined. The event information is identified at the time point in the video shot by the monitoring device.

According to a second aspect of the present disclosure, a video identification device is provided. The device includes an acquisition module, a first determination module and an identification module. The acquisition module is arranged to acquire event information representative of an event occurring in a space where a monitoring device is located. The first determination module is arranged to determine a time point corresponding to the event information in a video shot by the monitoring device. The identification module is arranged to identify the event information at the time point in the video shot by the monitoring device.

According to a third aspect of the present disclosure, a video identification device is provided. The device includes: a processor; and a memory arranged to store an instruction executable for the processor, where the processor may be arranged to execute and implement the abovementioned method.

According to a fourth aspect of the present disclosure, a non-transitory computer-readable storage medium is provided, in which a computer program instruction may be stored, the computer program instruction being executed by a processor to implement the abovementioned method.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

As more and more monitoring devices are installed at home, the collected video data may need a very large storage to store. Thus, there is a need for identifying and marking important video frames corresponding to important information. Further, the monitoring device may save storage space by removing or compressing video frames corresponding to unimportant information. Further, there is a need to identify and mark the frames with a time stamp so that the user can easily find the important information in the recorded video. According to the video identification method and device, the event information representative of the event occurring in the space where the monitoring device is located may be marked in the monitoring video, so that convenience and pertinence for browsing of the monitoring video are improved, and a user may conveniently search for and browse the monitoring video.

Figure 1:
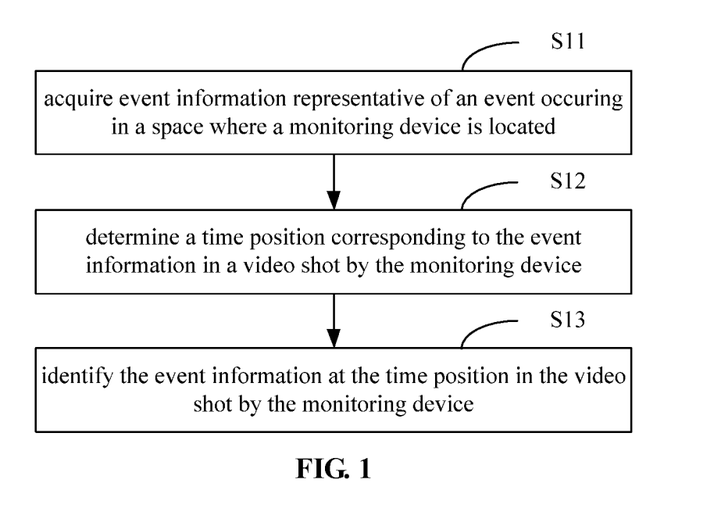
FIG. 1 is a flow chart showing a video identification method, according to an aspect of the disclosure.

FIG. 1 is a flow chart showing a video identification method, according to an aspect of the disclosure. The method is applied to terminal device such as a mobile phone, a tablet computer, a computer or a server, which will not be limited in the present disclosure. As shown in FIG. 1, the method includes Steps S11 to S13.

In Step S11, event information representative of an event occurring in a space where a monitoring device is located is acquired. For example, the terminal device may acquire event information from one or more monitoring devices via a wireless communication. Each monitoring device may send the event information directly to the terminal device or indirectly via a smart hub or other device.

In Step S12, a time point corresponding to the event information in a video shot by the monitoring device is determined. For example, the terminal device may determine the time point corresponding to the event information in the video by searching the video to identify video frames including the event information. The terminal device may use image recognition and/or video image processing algorithms to identify the video frames.

In Step S13, the event information is identified at the time point in the video shot by the monitoring device.

Here, the space where the monitoring device is located may refer to a shooting space region covered by the monitoring device. The event information may refer to a general description about the event, for example, "the person walks," "the door is opened," "the window is opened," "the curtain withdrawn" or "the television is turned on," which will not be limited in the present disclosure. The time point may refer to information about time when the event occurs, for example, a starting time point of the event or a duration of the event, which will not be limited in the present disclosure.

According to one or more embodiments, occurrence of an event at a certain time point may be identified in a manner of an icon in the video shot by the monitoring device. Upon triggering of the icon (for example, single click or location of a cursor on the icon), specific event information representative of the event occurring in the space where the monitoring device is located may further be displayed, where the icon may include an arrowhead and the like, which are not be limited in the present disclosure.

According to one or more embodiments, the action of acquiring the event information representative of the event occurring in the space where the monitoring device is located (Step S11) may include the following action. First event information generated by an intelligent terminal device in response to the event is acquired, and the first event information is determined as the event information.

Here, the intelligent terminal device may include a human body sensor, a door/window sensor, a curtain sensor, an intelligent television and the like, which are not limited in the present disclosure. The intelligent terminal device may generate the first event information in response to the event, where the first event information may be event information including no event performer. For example, the human body sensor may generate the first event information "the person walks" upon detection of the person walking within a detection range; the door/window sensor may generate the first event information "the door or the window is opened" upon detection of the door or window being opened; the curtain sensor may generate the first event information "the curtain is withdrawn" upon detection of the curtain being withdrawn; and the intelligent television may generate the first event information "the television is turned on" upon detection of it being turned on.

According to one or more embodiments, the terminal device establishes connections with the monitoring device, one or more in the human body sensor, the door/window sensor, the curtain sensor, the intelligent television, and the like in a wireless connection manner. The wireless connection manner may include infrared connection, Wireless-Fidelity (Wi-Fi) connection, Bluetooth (BT) connection, ZigBee connection or the like, which will not be limited in the present disclosure.

According to one or more embodiments, the terminal device establishes connections with the monitoring device and the door/window sensor in the wireless connection manner. The door/window sensor generates the first event information "the door is opened" under detection of the door being opened. The door/window sensor sends the first event information "the door is opened" to the terminal device. The terminal device determines that a starting time point corresponding to the first event information "the door is opened" in the video shot by the monitoring device is 13:05 under the condition of acquiring the first event information "the door is opened," and then the terminal device identifies the event information "the door is opened" at 13:05 in the video shot by the monitoring device.

According to one or more embodiments, the action of acquiring the event information representative of the event occurring in the space where the monitoring device is located (Step S11) may include the following action. The first event information generated by the intelligent terminal device in response to the event is acquired. Face recognition is performed on the video shot by the monitoring device, and an event performer corresponding to the first event information is determined. Second event information is generated according to the first event information and the event performer, and the second event information is determined as the event information.

According to one or more embodiments, a face may be pre-stored into a face database. Upon acquisition of the first event information generated by the intelligent terminal device in response to the event, the terminal device performs face extraction on the video shot by the monitoring device, and compares an extracted face with the face stored in the face database to determine the event performer corresponding to the first event information. For example, if the face extracted from the video matches with a pre-stored face in the face database, an identifier of the face in the face database is determined as the event performer, otherwise the terminal device may label the event performer as a stranger. The terminal device generates the second event information according to the first event information and the event performer corresponding to the first event information, where the second event information may be event information including the event performer.

Those skilled in the art may know that the present disclosure is not intended to limit a face type stored in the face database corresponding to the monitoring device. For example, for monitoring device used for a household, faces of family members may be pre-stored into a face database; and for monitoring device used for a company, faces of staff may be pre-stored into a face database.

According to one or more embodiments, the terminal device establishes connections with the monitoring device and the door/window sensor in the wireless connection manner. The door/window sensor generates the first event information "the door is opened" under detection of the door being opened. The door/window sensor sends the first event information "the door is opened" to the terminal device. Under the condition of acquiring the first event information "the door is opened," the terminal device performs face recognition on the video shot by the monitoring device, and determines that the event performer corresponding to the first event information "the door is opened" is a stranger. The terminal device generates the second event information "the stranger opens the door," and determines that a starting time point corresponding to the second event information "the stranger opens the door" in the video shot by the monitoring device is 13:05, and then the terminal device identifies the event information "the stranger opens the door" at 13:05 in the video shot by the monitoring device.

According to one or more embodiments, the action of acquiring the event information representative of the event occurring in the space where the monitoring device is located (Step S11) may include the following action. Upon detection of a change in an image in the video shot by the monitoring device, the video is analyzed to obtain the event information according to a pretrained event classifier.

According to one or more embodiments, events are classified, and the event classifier is trained according to event classes, where the event classes may include that "the person walks," "the door is opened," "the window is opened," "the curtain is withdrawn," "the television is turned on" or the like, which will not be limited in the present disclosure. Input of the event classifier may be the image (for example, the video or a picture), and output may be the event information representative of the event occurring in the space where the monitoring device is located.

According to one or more embodiments, upon detection of a change in the image in the video shot by the monitoring device, the terminal device captures a video segment where the image changes, and inputs the video segment into the event classifier. The event classifier analyzes the video segment, and outputs the event information, for example, "the door is opened," representative of the event occurring in the space where the monitoring device is located. The terminal device determines that the starting time point corresponding to the event information "the door is opened" is 13:05, and then the terminal device identifies the event information "the door is opened" at 13:05 in the video shot by the monitoring device.

It is important to note that those skilled in the art may know that the event information output by the event classifier is event information including no event performer. Furthermore, the terminal device may perform face recognition on the video shot by the monitoring device, determine the corresponding event performer and accordingly generate the event information including the event performer, which will not be limited in the present disclosure.

According to the video identification method of the present disclosure, the event information representative of the event occurring in the space where the monitoring device is located may be marked in the monitoring video, so that convenience and pertinence for browsing of the monitoring video are improved, and a user may conveniently search for and browse the monitoring video.

Figure 2:
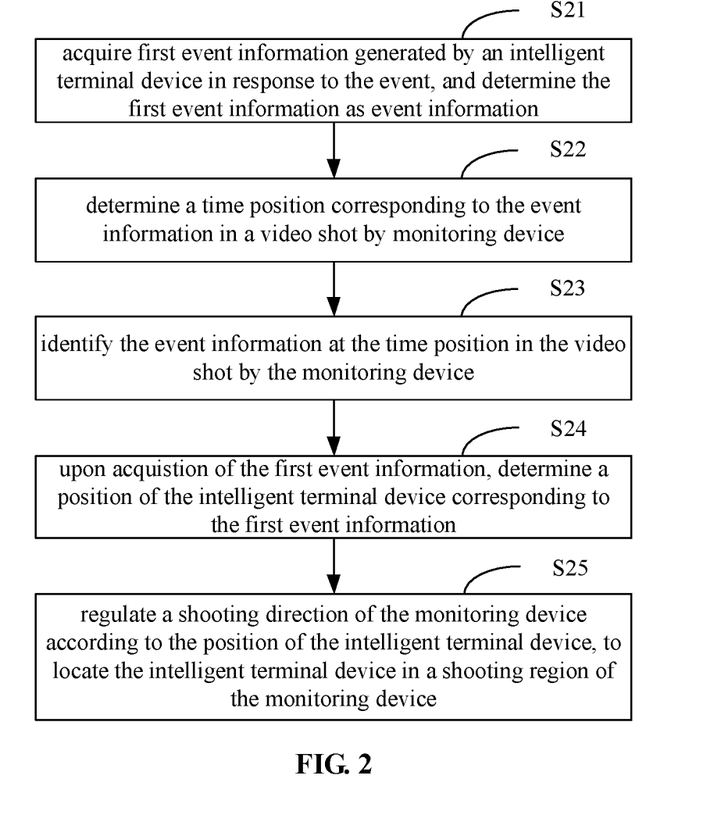
FIG. 2 is a schematic flow chart showing a video identification method, according to an aspect of the disclosure.

FIG. 2 is a schematic flow chart showing a video identification method, according to an aspect of the disclosure. As shown in FIG. 2, the method includes Steps S21 to S25.

In Step S21, first event information generated by intelligent terminal device in response to the event is acquired, and the first event information is determined as event information.

In Step S22, a time point corresponding to the event information in a video shot by monitoring device is determined.

In Step S23, the event information is identified at the time point in the video shot by the monitoring device.

In Step S24, upon acquisition of the first event information, a position of the intelligent terminal device corresponding to the first event information is determined.

In Step S25, a shooting direction of the monitoring device is regulated according to the position of the intelligent terminal device to locate the intelligent terminal device in a shooting region of the monitoring device.

According to one or more embodiments, the position of the intelligent terminal device may be set when a user mounts the intelligent terminal device. Furthermore, after occurrence of the event, the position of the intelligent terminal device may be intelligently identified by the monitoring device according to the shot video, which will not be limited in the present disclosure.

The present disclosure is not intended to limit a process of determining the position of the intelligent terminal device corresponding to the first event information. For example, terminal device sends the first event information to the monitoring device under the condition of acquiring the first event information, and the monitoring device determines the intelligent terminal device corresponding to the first event information and the position of the intelligent terminal device according to the first event information. For another example, the terminal device determines the intelligent terminal device corresponding to the first event information and the position of the intelligent terminal device according to the first event information under the condition of acquiring the first event information, and the terminal device sends the determined intelligent terminal device and position of the intelligent terminal device to the monitoring device. For another example, the terminal device determines the intelligent terminal device corresponding to the first event information and the position of the intelligent terminal device according to the first event information under the condition of acquiring the first event information, the terminal device generates a control instruction arranged to regulate the shooting direction of the monitoring device according to the position of the intelligent terminal device, and the terminal device sends the generated control instruction to the monitoring device.

According to one or more embodiments, the action of regulating the shooting direction of the monitoring device according to the position of the intelligent terminal device to locate the intelligent terminal device in the shooting region of the monitoring device (Step S25) may include the following actions. If the intelligent terminal device is located outside the current shooting region of the monitoring device, the shooting direction of the monitoring device is regulated to locate the intelligent terminal device in the shooting region of the monitoring device.

According to the video identification method of the present disclosure, the shooting direction of the monitoring device may be regulated according to the position of the intelligent terminal device to locate the intelligent terminal device in the shooting region of the monitoring device, so that shooting purposiveness and pertinence of the monitoring device are improved.

Figure 3:
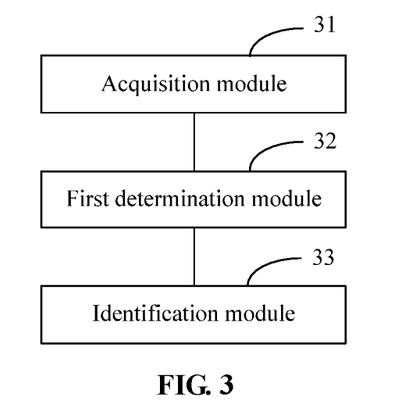
FIG. 3 is a block diagram of a video identification device, according to an aspect of the disclosure.

FIG. 3 is a block diagram of a video identification device, according to an aspect of the disclosure. Referring to FIG. 3, the device includes: an acquisition module 31, arranged to acquire event information representative of an event occurring in a space where a monitoring device is located; a first determination module 32, arranged to determine a time point corresponding to the event information in a video shot by the monitoring device; and an identification module 33, arranged to identify the event information at the time point in the video shot by the monitoring device.

According to one or more embodiments, the acquisition module 31 is arranged to: acquire first event information generated by intelligent terminal device in response to the event, and determine the first event information as the event information.

According to one or more embodiments, the acquisition module 31 is arranged to: acquire the first event information generated by the intelligent terminal device in response to the event; perform face recognition on the video shot by the monitoring device, and determine an event performer corresponding to the first event information; and generate second event information according to the first event information and the event performer, and determine the second event information as the event information.

According to one or more embodiments, the acquisition module 31 is arranged to: upon detection of a change in an image in the video shot by the monitoring device, analyze the video to obtain the event information according to a pretrained event classifier.

According to the video identification device of the present disclosure, the event information representative of the event occurring in the space where the monitoring device is located may be marked in the monitoring video, so that convenience and pertinence for browsing of the monitoring video are improved, and a user may conveniently search for and browse the monitoring video.

Figure 4:
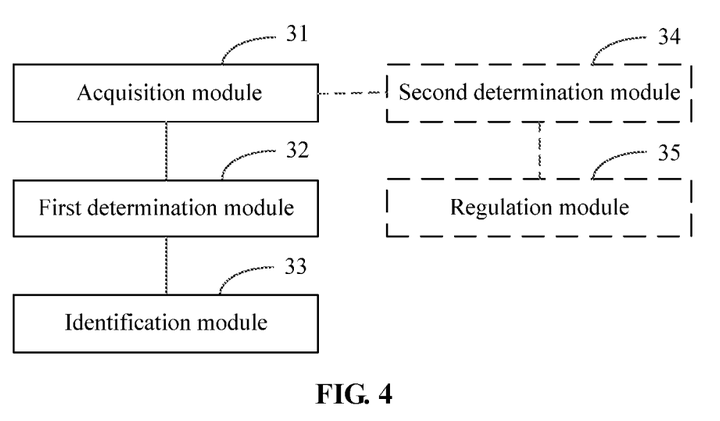
FIG. 4 is a schematic block diagram of a video identification device, according to an aspect of the disclosure.

FIG. 4 is a schematic block diagram of a video identification device, according to an aspect of the disclosure. Referring to FIG. 4.

According to one or more embodiments, the device further includes: a second determination module 34, arranged to, upon acquisition of the first event information, determine a position of the intelligent terminal device corresponding to the first event information; and a regulation module 35, arranged to regulate a shooting direction of the monitoring device according to the position of the intelligent terminal device to locate the intelligent terminal device in a shooting region of the monitoring device.

According to the video identification device of the present disclosure, the shooting direction of the monitoring device may be regulated according to the position of the intelligent terminal device to locate the intelligent terminal device in the shooting region of the monitoring device, so that shooting purposiveness and pertinence of the monitoring device are improved.

With respect to the devices in the above embodiments, the specific manners for performing operations for individual modules therein have been described in detail in the embodiments regarding the methods, which will not be elaborated herein.

Figure 5:
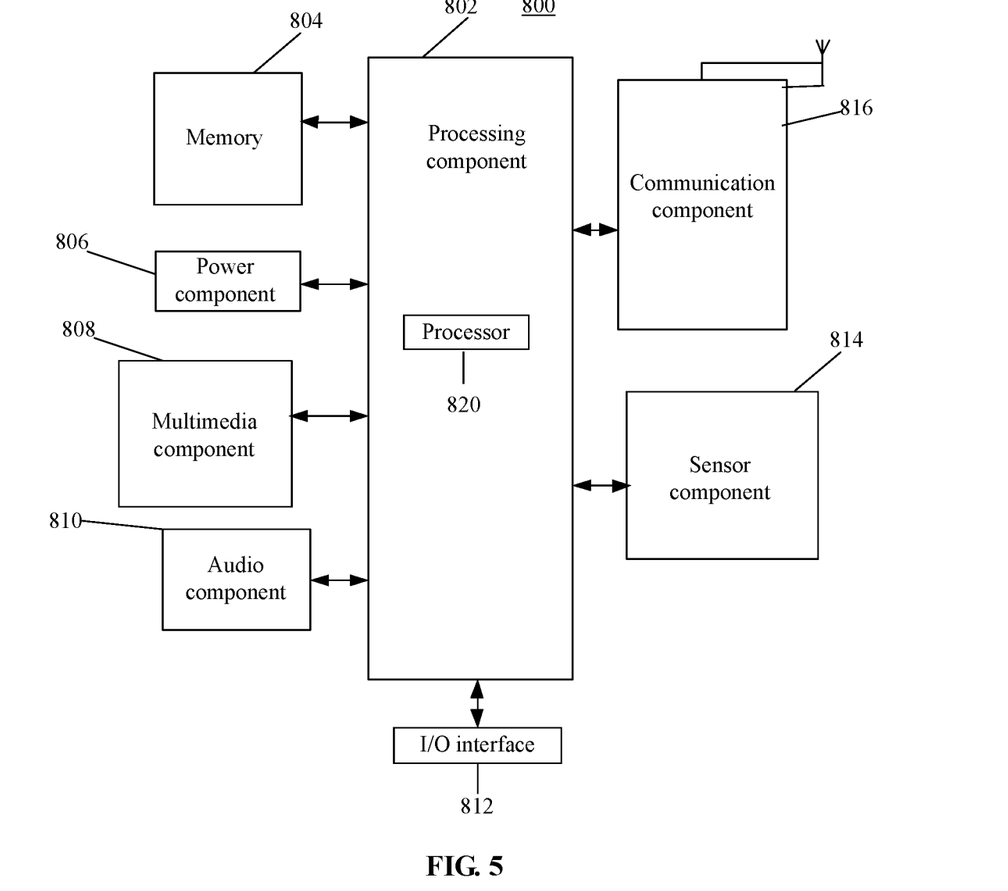
FIG. 5 is a block diagram of a video identification device, according to an aspect of the disclosure.

FIG. 5 is a block diagram of a video identification device 800, according to an aspect of the disclosure. For example, the device 800 may be a mobile phone, a computer, a digital broadcast terminal, a messaging device, a gaming console, a tablet, a medical device, exercise equipment, a personal digital assistant, and the like.

Referring to FIG. 5, the device 800 may include one or more of the following components: a processing component 802, a memory 804, a power component 806, a multimedia component 808, an audio component 810, an Input/Output (I/O) interface 812, a sensor component 814, or a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is arranged to store various types of data to support the operation of the device 800. Examples of such data include instructions for any application programs or methods operated on the device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the device 800. The power component 806 may include a power management system, one or more power supplies, and other components associated with the generation, management and distribution of power for the device 800.

The multimedia component 808 includes a screen providing an output interface between the device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is arranged to output and/or input an audio signal. For example, the audio component 810 includes a Microphone (MIC), and the MIC is arranged to receive an external audio signal when the device 800 is in the operation mode, such as a call mode, a recording mode and a voice recognition mode. The received audio signal may be further stored in the memory 804 or sent through the communication component 816. In some embodiments, the audio component 810 further includes a speaker arranged to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors arranged to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor arranged to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is arranged to facilitate wired or wireless communication between the device 800 and other equipment. The device 800 may access a communication-standard-based wireless network, such as a Wi-Fi network, a 2nd-Generation (2G) or 3rd-Generation (3G) network or a combination thereof. In an aspect of the disclosure, the communication component 816 receives a broadcast signal or broadcast associated information from an external broadcast management system through a broadcast channel. In an aspect of the disclosure, the communication component 816 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BT technology and another technology.

In an aspect of the disclosure, the device 800 may be implemented by one or more circuits including Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components. The device 800 may use the one or more circuits to execute the abovementioned method. Each module or sub-module may be implemented at least partially using the one or more circuits.

In an aspect of the disclosure, there is also provided a non-transitory computer-readable storage medium including an instruction, such as the memory 804 including an instruction, and the instruction may be executed by the processor 820 of the device 800 to implement the abovementioned method. For example, the non-transitory computer-readable storage medium may be a ROM, a Compact Disc Read-Only Memory (CD-ROM), a magnetic tape, a floppy disc, optical data storage equipment and the like.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A video identification method, comprising:
   acquiring, at a mobile terminal, event information representative of an event occurring in a shooting space region covered by a monitoring device, wherein the event information is generated by an intelligent sensor device in response to the event;
   determining, at the mobile terminal, a position of the intelligent sensor device corresponding to the event information, wherein the position of the intelligent sensor device is set when the intelligent sensor device is mounted;
   regulating, from the mobile terminal, a shooting direction of the monitoring device according to the position of the intelligent sensor device in order to position the intelligent sensor device in the shooting region covered by the monitoring device;
   determining, at the mobile terminal, a time point corresponding to the event information in a video shot by the monitoring device; and
   identifying, at the mobile terminal and using an icon, the event information at the time point in the video shot by the monitoring device, wherein the icon comprises an arrowhead used to identify the event information.

2. The method of claim 1, wherein acquiring, at the mobile terminal, the event information representative of the event occurring in the shooting space region covered by the monitoring device comprises:
   acquiring, at the mobile terminal, first event information generated by an intelligent terminal device in response to the event;
   determining, at the mobile terminal, an event performer corresponding to the first event information by performing face recognition on the video shot by the monitoring device; and
   acquiring, at the mobile terminal, the event information generated based on the first event information and the event performer.

3. The method of claim 1, wherein acquiring, at the mobile terminal, the event information representative of the event occurring in a shooting space region covered by the monitoring device comprises:
   analyze, at the mobile terminal and upon detection of a change in an image in the video shot by the monitoring device, the video to obtain the event information according to a pretrained event classifier.

4. The method of claim 1, wherein regulating, from the mobile terminal, the shooting direction of the monitoring device according to the position of the intelligent sensor device comprises:
   generating, at the mobile terminal, control instructions arranged to position the intelligent sensor device in the shooting region of the monitoring device; and
   sending, from the mobile terminal, the generated control instructions to the monitoring device.

5. The method of claim 1, wherein identifying, at the mobile terminal and using an icon, the event information comprises:
   displaying, at the terminal, the event information at the time point in the video shot by the monitoring device when the icon is triggered.

6. A video identification device, comprising:
   one or more processors; and
   a non-transitory computer-readable storage medium storing instructions executable by the one or more processors, wherein the one or more processors are configured to:
   acquire event information representative of an event occurring in a shooting space region covered by a monitoring device wherein the event information is generated by an intelligent sensor device in response to the event;
   determine a position of the intelligent sensor device corresponding to the event information, wherein the position of the intelligent sensor device is set when the intelligent sensor device is mounted;
   regulate a shooting direction of the monitoring device according to the position of the intelligent sensor device in order to position the intelligent sensor device in the shooting region covered by the monitoring device;
   determine a time point corresponding to the event information in a video shot by the monitoring device; and
   identify, using an icon, the event information at the time point in the video shot by the monitoring device, wherein the icon comprises an arrowhead used to identify the event information.

7. The device of claim 6, wherein wherein the one or more processors configured to acquire the event information representative of the event occurring in the shooting space region covered by the monitoring device are further configured to:
acquire first event information generated by an intelligent terminal device in response to the event;
determine an event performer corresponding to the first event information by performing face recognition on the video shot by the monitoring device; and
acquire the event information generated based on the first event information and the event performer.

8. The device of claim 6, wherein the one or more processors configured to acquire the event information representative of the event occurring in a shooting space region covered by the monitoring device are further configured to:
analyze, upon detection of a change in an image in the video shot by the monitoring device, the video to obtain the event information according to a pretrained event classifier.

9. The video identification device of claim 6, wherein the one or more processors configured to regulate the shooting direction of the monitoring device according to the position of the intelligent sensor device are further configured to:
generate control instructions arranged to position the intelligent sensor device in the shooting region of the monitoring device; and
send the generated control instructions to the monitoring device.

10. The video identification device of claim 6, wherein the one or more processors configured to identify, using the icon, the event information are further configured to:
display the event information at the time point in the video shot by the monitoring device when the icon is triggered.

11. A non-transitory computer-readable storage medium storing a plurality of programs for execution by a computing device having one or more processors, wherein the plurality of programs, when executed by the one or more processors, cause the computing device to perform:
acquiring event information representative of an event occurring in a shooting space region covered by a monitoring device, wherein the event information is generated by an intelligent sensor device in response to the event;
determining a position of the intelligent sensor device corresponding to the event information, wherein the position of the intelligent sensor device is set when the intelligent sensor device is mounted;
regulating a shooting direction of the monitoring device according to the position of the intelligent sensor device in order to position the intelligent sensor device in the shooting region covered by the monitoring device;
determining a time point corresponding to the event information in a video shot by the monitoring device; and
identifying, using an icon, the event information at the time point in the video shot by the monitoring device, wherein the icon comprises an arrowhead used to identify the event information.

12. The non-transitory computer-readable storage medium of claim 11, wherein the plurality of programs caused the computing device to perform acquiring the event information representative of the event occurring in the shooting space region covered by the monitoring device further cause the computing device to perform:
acquiring first event information generated by an intelligent terminal device in response to the event;
determining an event performer corresponding to the first event information by performing face recognition on the video shot by the monitoring device; and
acquiring the event information generated based on the first event information and the event performer.

13. The non-transitory computer-readable storage medium of claim 11, wherein the plurality of programs caused the computing device to perform acquiring the event information representative of the event occurring in a shooting space region covered by the monitoring device further cause the computing device to perform:
analyze, upon detection of a change in an image in the video shot by the monitoring device, the video to obtain the event information according to a pretrained event classifier.

14. The non-transitory computer-readable storage medium of claim 11, wherein the plurality of programs caused the computing device to perform regulating the shooting direction of the monitoring device according to the position of the intelligent sensor device further cause the computing device to perform:
generating control instructions arranged to position the intelligent sensor device in the shooting region of the monitoring device; and
sending the generated control instructions to the monitoring device.

15. The non-transitory computer-readable storage medium of claim 11, wherein the plurality of programs caused the computing device to perform identifying, using an icon, the event information further cause the computing device to perform:
displaying, at the terminal, the event information at the time point in the video shot by the monitoring device when the icon is triggered.

* * * * *